(12) United States Patent
Frederiksen et al.

(10) Patent No.: US 11,946,873 B2
(45) Date of Patent: Apr. 2, 2024

(54) DETECTION DEVICE FOR DETECTING CONTAMINATION

(71) Applicant: Robert Bosch GmbH, Stuttgart (DE)

(72) Inventors: Annette Frederiksen, Renningen (DE); Stefanie Hartmann, Rottenburg am Neckar (DE); Tobias Peterseim, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 890 days.

(21) Appl. No.: 16/961,239

(22) PCT Filed: Jan. 15, 2019

(86) PCT No.: PCT/EP2019/050858
§ 371 (c)(1),
(2) Date: Aug. 27, 2020

(87) PCT Pub. No.: WO2019/141644
PCT Pub. Date: Jul. 25, 2019

(65) Prior Publication Data
US 2021/0063318 A1    Mar. 4, 2021

(30) Foreign Application Priority Data

Jan. 16, 2018    (DE) .................. 10 2018 200 626.1

(51) Int. Cl.
*G01N 21/94*    (2006.01)
*G01N 21/552*    (2014.01)
(Continued)

(52) U.S. Cl.
CPC ........... *G01N 21/94* (2013.01); *G01N 21/552* (2013.01); *G01S 7/4813* (2013.01); *G01S 7/4817* (2013.01);
(Continued)

(58) Field of Classification Search
CPC .............. G01N 21/94; G01N 21/552; G01N 2201/0635; G02B 5/32; G03H 1/0005; G03H 1/0248; G03H 2001/0033
See application file for complete search history.

(56) References Cited

U.S. PATENT DOCUMENTS 5,684,611 A * 11/1997 Rakuljic ............. H01S 3/08009
5,691,989 A * 11/1997 Rakuljic ................. H01S 5/141
359/22
(Continued)

FOREIGN PATENT DOCUMENTS

CN    1348095 A    5/2002
DE    19530289 A1    2/1997
(Continued)

OTHER PUBLICATIONS

International Search Report dated Mar. 25, 2019 in connection with International Application No. PCT/EP2019/050858.

*Primary Examiner* — Abdullahi Nur
(74) *Attorney, Agent, or Firm* — NORTON ROSE FULBRIGHT US LLP; Gerard A. Messina

(57) ABSTRACT

A detection device for detecting contamination of an optical element. The detection device includes a coupling device, including a first coupling element for coupling light of at least one wavelength from a light source into the optical element, and a second coupling element for coupling light out from the optical element, at least one of the coupling elements including a hologram, and having a detector for acquiring the coupled-out light.

10 Claims, 3 Drawing Sheets (conventional lidar sensor)

(51) Int. Cl.
  *G01S 7/481* (2006.01)
  *G01S 7/497* (2006.01)
  *G02B 5/32* (2006.01)
  *G03H 1/00* (2006.01)
  *G03H 1/02* (2006.01)

(52) U.S. Cl.
  CPC ............... *G01S 7/497* (2013.01); *G02B 5/32* (2013.01); *G03H 1/0005* (2013.01); *G03H 1/0248* (2013.01); *G01N 2201/0635* (2013.01); *G01S 2007/4975* (2013.01); *G03H 2001/0033* (2013.01)

(56) References Cited

U.S. PATENT DOCUMENTS

| | | | |
|---|---|---|---|
| 5,777,760 A * | 7/1998 | Hays | G11B 7/00781 359/24 |
| 6,108,084 A | 8/2000 | Winner | |
| 6,307,198 B1 | 10/2001 | Asakura et al. | |
| 6,580,529 B1 * | 6/2003 | Amitai | G02B 27/0944 359/13 |
| 6,842,271 B2 | 1/2005 | Sautter et al. | |
| 10,670,876 B2 * | 6/2020 | Popovich | G02B 6/0038 |
| 2005/0006573 A1 | 1/2005 | Dollmann et al. | |
| 2008/0212151 A1 | 9/2008 | Wolf et al. | |
| 2014/0049983 A1 * | 2/2014 | Nichol | G02B 6/0018 362/610 |
| 2019/0146221 A1 * | 5/2019 | Oku | G02B 27/0172 359/13 |
| 2019/0331921 A1 * | 10/2019 | Suzuki | G02B 27/02 |

FOREIGN PATENT DOCUMENTS

| | | |
|---|---|---|
| DE | 19701258 A1 | 7/1997 |
| DE | 202006014925 U1 | 12/2006 |
| DE | 102005062785 A1 | 7/2007 |
| DE | 102006045916 A1 | 4/2008 |
| DE | 102013211738 A1 | 12/2014 |
| EP | 736426 A1 | 10/1996 |
| EP | 1698532 A2 | 9/2006 |
| WO | 03012408 A1 | 2/2003 |
| WO | 2006040241 A1 | 4/2006 |

* cited by examiner (conventional lidar sensor)

DETECTION DEVICE FOR DETECTING CONTAMINATION

FIELD

The present invention relates to a detection device for the detection of contamination on an optical element.

The present invention further relates to a sensor device for the detection of objects using light of at least one wavelength.

The present invention further relates to a method for producing a coupling device for coupling light in and out.

Although the present invention is applicable to any optical elements, the present invention is described in relation to covering glasses, exit windows, or cover glasses.

Although the present invention is applicable to any sensor devices, the present invention is described in relation to lidar sensor devices.

BACKGROUND INFORMATION

For protection against dirt and water, and for encapsulation, lidar sensor devices can be provided with a cover glass that is transparent to the respective wavelength. Due to ambient conditions, dirt and water are deposited on this cover glass, which disturbs the optical path for the recognition of objects by a lidar sensor device.

German Patent Application No. DE 10 2013 211 738 A1 describes a rain sensor. Here, electromagnetic radiation is coupled into a cover glass via a coupling-in element, and, after passing through a certain part of the cover glass, is again coupled out from the cover glass via a coupling-out element and is supplied to a detector. Via the electromagnetic radiation detected by the detector, the presence of drops on the surface of the cover glass is inferred.

SUMMARY

In a specific example embodiment, the present invention provides a detection device for the detection of contamination of an optical element, having
  a coupling device including a first coupling element for coupling in light of at least one wavelength from a light source into an optical element, and a second coupling element for coupling out light from the optical element, at least one of the coupling elements including a hologram, and
  a detector for acquiring the coupled-out light.

In a further specific embodiment, the present invention provides a sensor device for the detection of objects using light of at least one wavelength, including an object light source for emitting light of at least one wavelength into an object space, an object detector for receiving light reflected by an object, an optical element designed as a covering of the sensor device, and a detection device as recited in one of Claims 1-7, the coupling device and the covering of the sensor device being designed so as to work together for the coupling in and out of light.

In a further specific embodiment, the present invention provides a method for producing a coupling device, including the steps
  providing a first coupling element for coupling light into an optical element,
  providing a second coupling element for coupling light out from the optical element,
  at least one coupling element being provided by printing or by an analogous recording of a hologram on a bearer material.

One of the advantages thereby achieved is that through the use of a hologram in at least one coupling element, or through a realization of at least one of the coupling elements as a hologram, an efficient and low-cost monitoring is enabled of contamination, for example of a lidar system, on a protective glass, cover glass, or the like. A further advantage is the low-cost production, as well as the small constructive space, compared to conventional coupling-in and coupling-out elements. In addition, increased flexibility is achieved with regard to the concrete embodiment and the diffraction efficiency. Likewise, a simple implementation is possible with simultaneous robustness of the device.

Further features, advantages, and further specific embodiments of the present invention are described below.

According to an advantageous development of the present invention, the hologram is designed as a volume hologram. In this way, the flexibility is further increased, because due to the volume diffraction through the volume hologram, the at least one coupling element can be further given a specified wavelength selectivity and/or angular selectivity, as well as, if appropriate, a filtering function. As a function of the corresponding condition with regard to wavelength and/or angle, only light from defined directions and having defined wavelengths is then diffracted at the volume hologram.

Interfering light can be effectively reduced due to the angular and wave selectivity of volume holograms.

According to a further advantageous development of the present invention, the hologram is made so as to be deflecting and at least partly focusing. In this way, the efficiency can be further increased.

According to a further advantageous development of the present invention, the hologram is designed as a transmission grating or reflection grating. This increases the flexibility, because the at least one coupling element can be realized as a transmission grating or reflection grating.

According to a further advantageous development of the present invention, the coupling element is designed as a holographic film. This enables a particularly small constructive space with simultaneous low-cost production.

According to a further advantageous development of the present invention, at least one of the coupling elements is situated at least partly in the optical element. This enables a space-saving configuration, for example together with a protective glass.

According to a further advantageous development of the present invention, the detector is designed to detect an attenuation of a light from the light source that is totally internally reflected in the optical element. An advantage of this is that in this way contamination can be detected easily and at the same time efficiently. If for example dirt or water is present on a protective window of a lidar system, a light-conducting function of the protective window, based on total internal reflection, is interrupted due to the contamination, which causes a loss of intensity at the detector.

According to a further advantageous development of the present invention, light from the object light source can be coupled in by the first coupling element. An advantage of this is that an additional light source for the detection can be omitted, which reduces costs.

According to a further advantageous development of the sensor device in accordance with the present invention, the object light source of the sensor device has a useful field of view region and a side field of view region, and the first coupling element of the coupling device for coupling in light is situated in the side field of view region. One of the advantages thereby achieved is that in this way the function of the sensor device, for example of a lidar system, is not influenced, while at the same time an additional light source for the detection can be omitted.

According to a further advantageous development of the example method of the present invention, the at least one coupling element is laminated onto the optical element. This enables a particularly low-cost and simple fastening on the optical element.

Further features and advantages of the present invention result from the Figures, and from the associated description of the Figures herein.

Of course, the features named above and explained in the following may be used not only in the respectively indicated combination, but also in other combinations or by themselves, without departing from the scope of the present invention.

Preferred embodiments and specific embodiments of the present invention are shown in the figures and are explained in more detail in the following description, in which identical reference characters relate to identical or similar or functionally identical components or elements.

DETAILED DESCRIPTION OF EXAMPLE EMBODIMENTS

Figure 1:
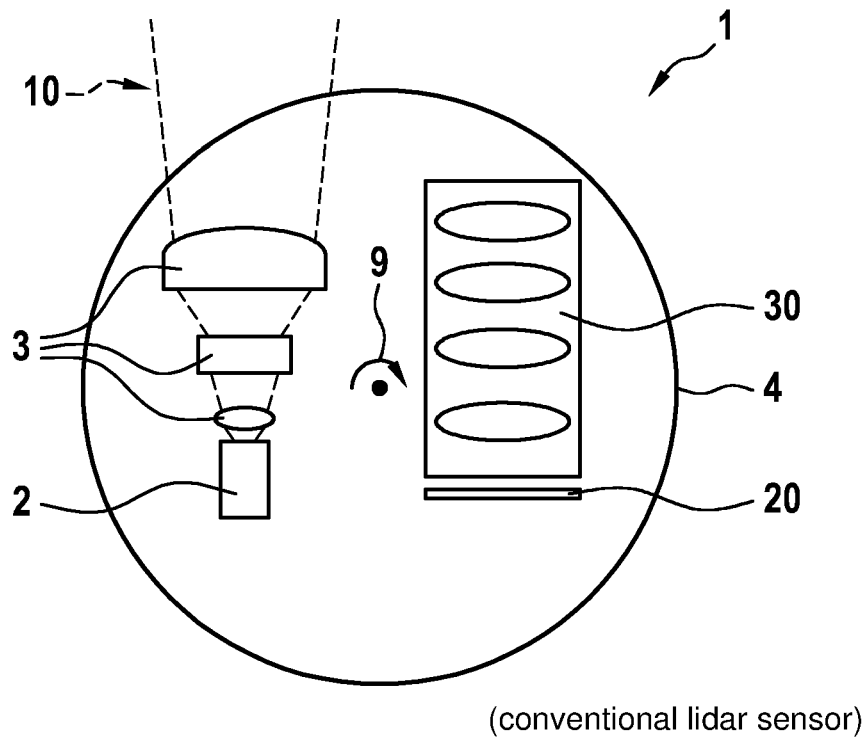
FIG. 1 shows a conventional lidar sensor.

FIG. 1 shows a conventional lidar sensor.

FIG. 1 shows a rotating lidar sensor 1. Rotating lidar sensor 1 is surrounded by a protective glass 4. Inside protective glass 4, which in particular is made stationary, is situated a light source 2 in the form of a laser that emits, via a transmission optical system 3, a light beam 10 having a slight divergence in the horizontal. In addition, a detector 20 is provided before which a receiving optical system 30 is situated in order to receive light of laser 2 reflected by an object. Laser 2, transmitting optical system 3, receiving optical system 30, and detector 20 are capable of rotation together in the clockwise direction about an axis perpendicular to the plane of the drawing (reference character 9). Protective glass 4 is used for protection, for example against dirt and water, and for encapsulation. If dirt or water deposits on protective glass 4, the optical path of emitted light beam 10 and of the received beam (not shown here) is disturbed, and lidar sensor 1 does not operate correctly, or there are losses of resolution and range.

Figure 2:
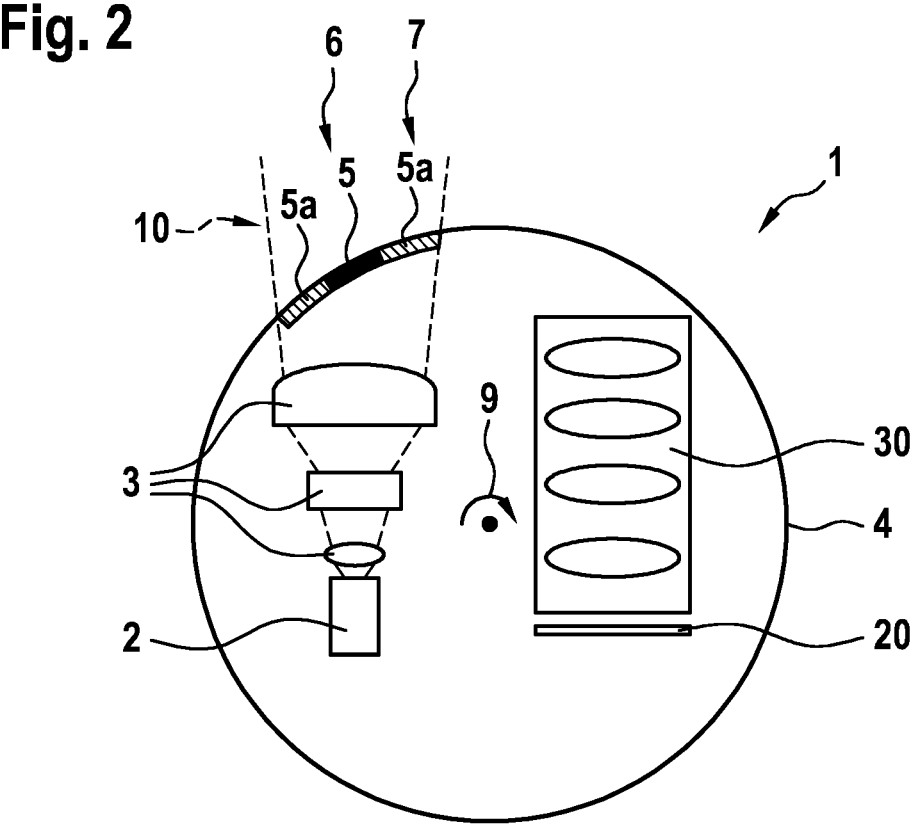
FIG. 2 shows a detection device in a lidar sensor according to a specific example embodiment of the present invention.

FIG. 2 shows a detection device in a lidar sensor according to a specific embodiment of the present invention.

FIG. 2 shows a lidar sensor 1 according to FIG. 1. Differing from lidar sensor 1 according to FIG. 1, in the lidar sensor 1 according to FIG. 2 a coupling device 5, 5a, having a coupling element in the form of a holographic optical element 6 and a coupling-out element in the form of a holographic optical element 7, is situated in the region of emitted light beam 10. Both are situated on the inside of protective glass 4. It is also possible to situate coupling-in element 6 and/or coupling-out element 7 in protective glass 4, i.e., in the protective glass composite. Coupling device 5, 5a may here (in the view of FIG. 2) cover only a partial area of emitted light beam 2 (reference character 5), or may completely cover it (reference character 5a). In FIG. 2, light beam 10 is emitted essentially in the plane of the drawing. Due to the Gaussian beam profile of light beam 10 of laser 2, and due to a corresponding transmitting optical system 3, light beam 10 also has a vertical component perpendicular to the plane of the drawing. This vertical component of light beam 10 can be used by configuring coupling device 5, 5a in such a way that light of the vertical component is decoupled into protective glass 4 via coupling device 5, 5a. The corresponding coupling-out element 7 is then preferably situated in a region on protective glass 4 that is no longer contacted by light 10 of laser 2. Coupling-in element 6 has the function of deflecting a part of the radiation of lidar sensor 1 in such a way that it runs in protective glass 4 at the angle of the total internal reflection. If coupling-in element 6 and/or the corresponding coupling-out element 7 of coupling device 5, 5a is designed as a volume hologram, the efficiency can be adapted as desired to the respective application, and a diffraction efficiency of up to 100% can be achieved.

In order to produce a multiplicity of coupling-in and/or coupling-out elements 6, 7 with holograms, a master hologram is produced having a selected deflecting function, and, if appropriate, in addition with a partly focusing function. Subsequently, this can be reproduced using the method of contact copying, in which the reference efficiency is set by the copying method. The master hologram can be printed, or recorded in an analogous fashion, and, depending on the position of the hologram on protective glass 4, i.e. of the coupling-in and/or coupling-out element 6, 7, the efficiency can be adapted in such a way that the basic function of lidar sensor 1, namely object recognition, is not limited.

Figure 3B:
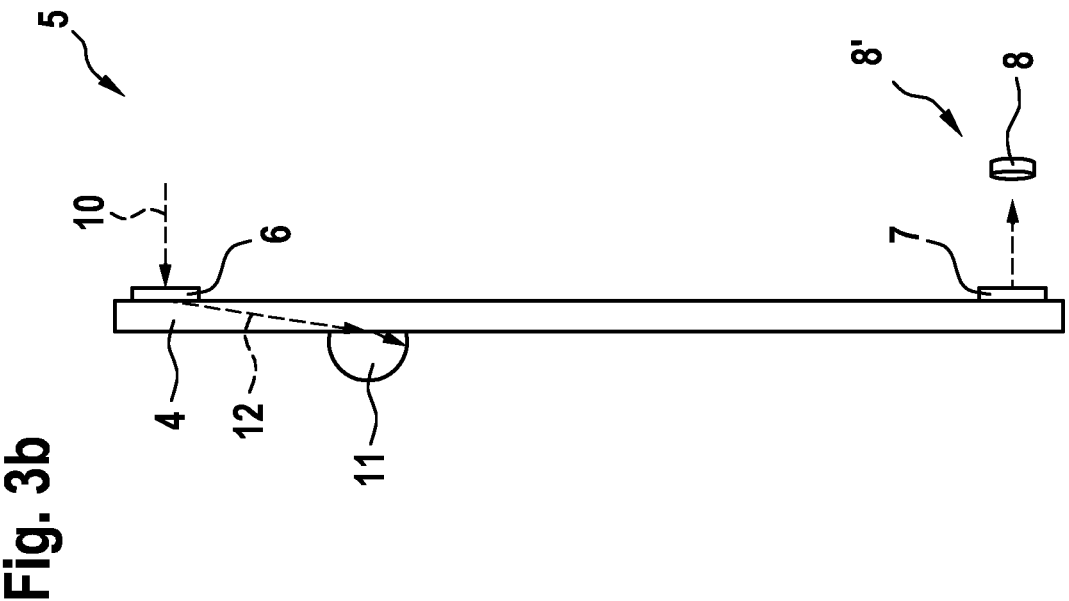
FIG. 3b shows a part of a detection device and an optical element with contamination according to a specific embodiment of the present invention.
Figure 3A:
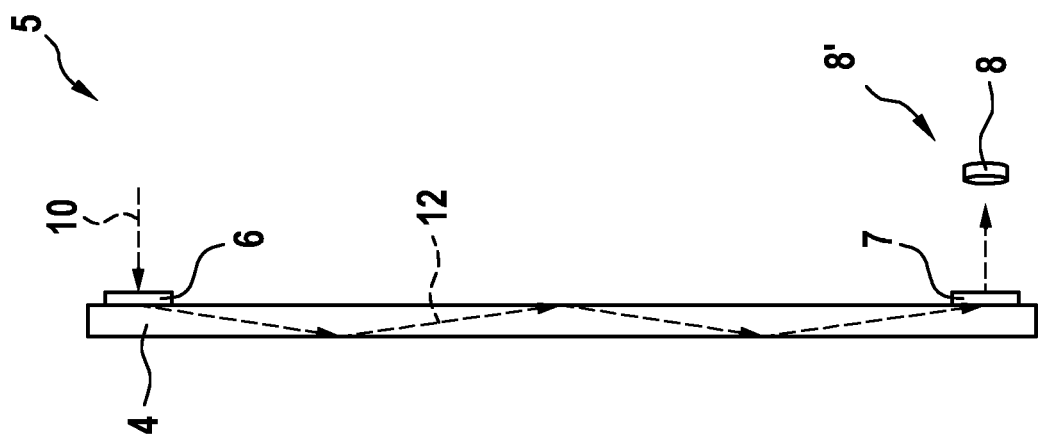
FIG. 3a shows a part of a detection device and an optical element without contamination according to a specific embodiment of the present invention.

FIG. 3a shows a part of a detection device and an optical element without contamination according to a specific embodiment of the present invention, and FIG. 3b shows a part of a detection device and an optical element with contamination according to a specific embodiment of the present invention.

FIG. 3a shows a detection device 8' in detail. Here, a coupling-in element 6 and a coupling-out element 7 of a coupling device 5, each including at least one hologram, are situated on a protective glass 4. Light 10 from object light source 2 of lidar sensor 1 meets coupling-in element 6, and is coupled into protective glass 4 at an angle, so that it is propagated along in protective glass 4 by total internal reflection (light beam 12). At a suitable location, this light beam is coupled out from protective glass 4 via coupling-out element 7, and is provided to a detector 8 of detection device 8'.

FIG. 3b shows the case in which water or dirt 11 is situated on the side of protective glass 4 facing away from detection device 8. Here, the light beam 12, coupled into the interior of protective glass 4 and transmitted by total internal reflection, is at least partly prevented by contamination 11 from being totally internally reflected. In other words, if dirt or water 11 is present on protective glass 4 of lidar sensor 1, the waveguide function of protective glass 4 is at least partly interrupted, and this results in a loss of intensity of the coupled-out light at detector 8.

Generally, the exit of the electromagnetic wave, i.e. here light beam 12, from the optically denser medium having refraction index $n_1$ into the optically thinner medium (usually air) having refraction index $n_2$, where $n_1 > n_2$, is responsible for this effect. The part of the electromagnetic wave that is situated in the optically thin medium is also called the evanescent field.

In this way, through the attenuation of the totally internally reflected light it is possible to measure particles or films that are in contact with the surface of a material that is transparent to the light that is being used, because these particles interact with the evanescent field, and absorb parts of the field or can scatter out from the material.

Figure 4:
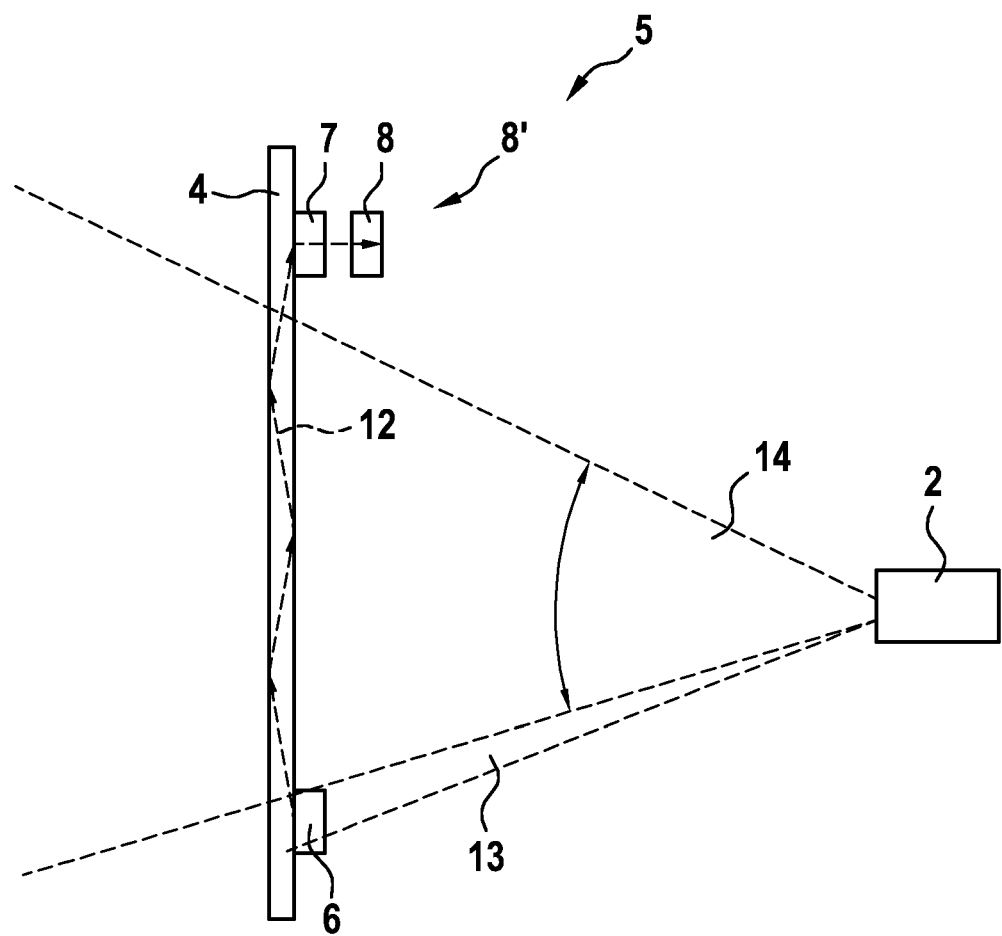
FIG. 4 shows a part of a sensor device according to a specific embodiment of the present invention.

FIG. 4 shows a part of a sensor device according to a specific embodiment of the present invention.

FIG. 4 shows a part of a lidar sensor 1. The plane of the drawing of FIG. 4 here corresponds essentially to the plane perpendicular to the plane of the drawing of FIG. 2. A light source in the form of a laser 2 is protected by a protective glass 4. On the side of protective glass 4 facing laser 2, a coupling-in element 6 and a coupling-out element 7 are situated, both realized as holographic optical elements, i.e. each including a hologram. Coupling-out element 7 is situated above coupling-in element 6 in the vertical direction. At the side of coupling-out element 7, there is situated a detection device 8' including a detector 8 for detecting the light coupled out by coupling-out element 7. In addition, laser 2 and a transmission optical system 3 (not shown here) have two different regions 13 and 14. Region 14 is the so-called useful region or useful field of view region that is used for the detection of objects by lidar sensor 1. This region 14 is situated substantially centrically to the mid-axis of laser 2, or of transmitting optical system 3. Laterally, or above and below useful region 14, there is a side region or edge region 13 that is not used for the detection of objects, but is also contacted by light from laser 2 with transmitting optical system 3. This region of the transmitted radiation of laser 2 is used here for the detection of contamination. Light from side region 13 impinges on coupling-in element 6, is totally internally reflected in the interior of protective glass 4 (light beam 12 inside protective glass 4), and is coupled out via coupling-out element 7 and is supplied to detector 8 for the detection. Overall, this has the advantage that no additional light source is required for the detection of contamination. In other words: one and the same light source, namely laser 2, is used for the recognition or detection of objects and for the detection of contamination.

It is also possible to situate coupling-in element 6 for example in a central region of the useful field of view region 14 of lidar sensor 1. A coupling-in hologram 6 with low efficiency can then be provided so that the used portion of the useful light is as low as possible. Also, as shown in FIG. 4, coupling-in element 6 can also be situated at the edge of protective glass 4. Here, in particular due to a sensing optical system 3, and due to the Gaussian beam profile of light beam 10 of laser 2, the intensity decreases, and the efficiency of coupling-in hologram 6 is chosen to be higher. In other words: the useful field of view region 14 is formed not only by the Gaussian beam profile of light beam 10, but also by the corresponding transmitting optical system 3. Lidar sensor 1 can be designed such that the illumination with laser 2 with transmitting optical system 3 is designed to be somewhat larger (for example in the upper or lower region) than region 14 required for the useful field of view. Thus, laser 2 can also be used for the detection of contamination without impairing useful field of view region 14. This specific embodiment can be used both in a lidar sensor 1 having a column illumination (columns are made longer) and in a lidar sensor 1 having point illumination (a point is more illuminated).

In sum, at least one of the specific embodiments of the present invention has at least one of the following advantages:

Free selection of angle of incidence and angle of reflection, and thus flexibility in the spatial configuration of the coupling-in element, coupling-out element, and detector.

Flexibility with regard to the design: coupling-in element and coupling-out element can be printed and adapted individually to the corresponding device.

Flexibility with regard to the realization as transmission grating or reflection grating, and with regard to the refraction efficiency.

Robustness.

Simple implementation, because for example a lidar system is not influenced.

Flexibility with regard to the realization of the surface to be monitored on the protective glass/cover glass.

Low costs, because no separate light source is necessary.

High efficiency in the detection of contamination or general interference points on the protective glass by total internal reflection.

The detector can be situated in a housing of the sensor device. This is advantageous in particular in rotating systems, because no additional data have to be transmitted from a rotor into a stator.

Simple adaptation and integration, in particular to microscanners and macroscanners.

Flexibility with regard to the size and design of the coupling elements.

Although the present invention has been described on the basis of preferred exemplary embodiments, it is not limited thereto, but rather can be modified in many ways.

What is claimed is:

1. A detection device for a sensor, the detection device comprising:
   a first light guide;
   a second light guide laterally offset from the first light guide; and
   a detector;
   wherein:
   (a) the first light guide is arranged relative to a light source of the sensor and relative to a cover of the sensor through which a first portion of light generated by the light source of the sensor passes to outside of the sensor, and (b) the second light guide is arranged relative to the cover of the sensor and relative to the detector such that a second portion of the light generated by the light source of the sensor is guided by the first light guide to be internally reflected, within the cover, between opposing surfaces of the cover until reaching the second light guide, which then deflects the second portion of the light that has reached the second light guide to the detector in an interior of the sensor;
   the detector is configured to monitor whether the cover is contaminated by identifying an extent of attenuation of the second portion of the light that has been guided to the detector within the interior of the sensor; and
   at least one of the first and second light guides is a hologram.

2. The detection device as recited in claim 1, wherein the hologram is a volume hologram.

3. The detection device as recited in claim 1, wherein the hologram is configured in deflecting fashion and at least partly in focusing fashion.

4. The detection device as recited in claim 1, wherein the hologram is a transmission grating or a reflection grating.

5. The detection device as recited in claim 1, wherein at least one of the first and second light guides is a holographic film.

6. The detection device as recited in claim 1, wherein at least one of the first and second light guides is at least partly in the cover.

7. A sensor, comprising:
- a cover covering an interior of the sensor;
- an object light source configured to emit light towards the cover so that a first portion of the emitted light passes through the cover to an area outside of the sensor;
- an object detector configured to receive a reflection of the first portion of the emitted light that has been reflected by an object that is located in the area outside of the sensor, wherein the sensor is configured to detect presence of the object based on the light reception by the object detector;
- a first light guide;
- a second light guide laterally offset from the first light guide; and
- a contamination detector;

wherein:
- (a) the first light guide is arranged relative to the object light source and relative to the cover and (b) the second light guide is arranged relative to the cover of the sensor and relative to the contamination detector such that a second portion of the light emitted by the object light source is guided by the first light guide to be internally reflected, within the cover, between opposing surfaces of the cover until reaching the second light guide, which then deflects the second portion of the light that has reached the second light guide to the contamination detector in the interior of the sensor;
- the contamination detector is configured to monitor whether the cover is contaminated by identifying an extent of attenuation of the second portion of the light that has been guided to the detector within the interior of the sensor; and
- at least one of the first and second light guides is a hologram.

8. The sensor device as recited in claim 7, wherein the object light source is configured to emit light towards the cover as a beam, and the object light source is arranged relative to the cover and relative to the first light guide so that a first beam region of the emitted beam passes the first light guide, thereby reaching the cover without impinging upon the first light guide, and a second beam region of the emitted beam impinges upon the first light guide.

9. A method for producing a detection device for a sensor, the method comprising the following steps:
- providing a first light guide;
- providing a second light guide;
- providing a detector; and
- arranging the first light guide and the second light guide so that:
  - (a) the second light guide is laterally offset from the first light guide; and
  - (b) (i) the first light guide is arranged relative to a light source of the sensor and relative to a cover of the sensor through which a first portion of light generated by the light source of the sensor passes to outside of the sensor, and (ii) the second light guide is arranged relative to the cover of the sensor and relative to the detector such that a second portion of the light generated by the light source of the sensor is guided by the first light guide to be internally reflected, within the cover, between opposing surfaces of the cover until reaching the second light guide, which then deflects the second portion of the light that has reached the second light guide to the detector in an interior of the sensor;

wherein;
- the detector is configured to monitor whether the cover is contaminated by identifying an extent of attenuation of the second portion of the light that has been guided to the detector within the interior of the sensor; and
- the provision of at least one of the first and second light guides is performed by printing or recording a hologram on a bearer material.

10. The method as recited in claim 9, wherein the at least one of the first and second light guides is laminated onto the cover.

* * * * *